Aug. 22, 1933.   E. A. SAUTER   1,923,889
CIRCUIT BREAKER
Filed Oct. 17, 1931
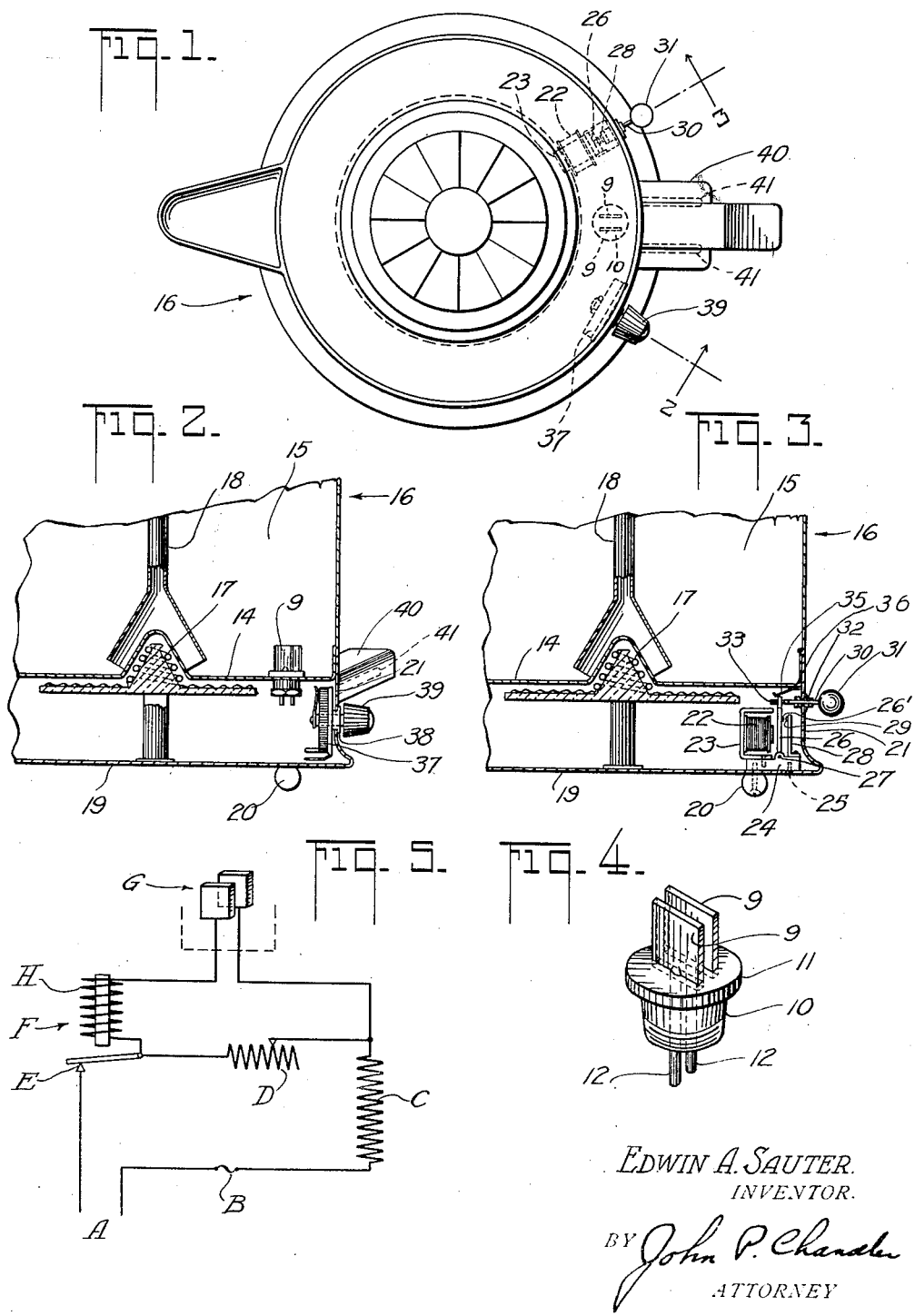
EDWIN A. SAUTER.
INVENTOR.
BY John P. Chandler
ATTORNEY Patented Aug. 22, 1933

1,923,889

UNITED STATES PATENT OFFICE 1,923,889

CIRCUIT BREAKER

Edwin A. Sauter, Mount Vernon, N. Y.

Application October 17, 1931. Serial No. 569,382

8 Claims. (Cl. 219—44)

This invention relates to circuit breaking devices and relates more particularly to a novel circuit breaking apparatus adapted to be employed as an indicator in the process of preparing liquids and other fluid substances.

In the preparation of certain fluid substances, as by the application of heat, particularly in the case of beverages, such as coffee, it is desirable to provide automatic means for indicating when the fluid substance has reached a certain point in the course of its preparation or has reached its final or predetermined strength.

The present invention utilizes the degree of conductivity of electricity of the fluid substance as a means for determining when the latter has reached a predetermined strength, and although the greatest application of the invention is in connection with liquids wherein no definite chemical change is created by the passage of electric current through the liquid lying between the electrodes, it nevertheless may be employed equally well in instances wherein some electrolysis is present.

The particular embodiment of the invention shown for illustration in the drawing is a circuit breaking device for a conventional, electrically-heated coffee percolator, and one of its principal objects is the provision of a device to be employed in combination with a coffee percolator which will automatically open the circuit when the coffee has reached a certain predetermined strength.

Another object of the invention is to provide a circuit breaking device for a coffee percolator or other apparatus used in the preparation of beverages wherein means will be provided for adjustment of the circuit breaker in order that the user may set the device for strong coffee or coffee of medium strength or otherwise and when the coffee has reached the desired state the circuit will be opened.

The invention also contemplates the provision of a device of the kind above referred to, which will be simple and inexpensive to construct, and will require no attention on the part of the user apart from setting the device for coffee of the proper strength.

The present invention, as applied to a device for the preparation of beverages, is based upon the knowledge that the electrical conductivity of the beverage is in direct proportion to its density, strength and/or specific gravity. I accordingly secure two electrodes within the liquid chamber of the device and, in the case of the coffee percolator, as the water boils and becomes coffee, the resistance to the flow of electricity between electrodes decreases, causing the circuit to be opened in the following manner. I provide a small variable resistance unit or rheostat in series with the main circuit of the percolator. Shunted around and in a circuit parallel with this unit is another circuit having, in series, the two electrodes and providing a relay coil which actuates a circuit breaker in series with the main circuit.

When preparation of the coffee is first begun, the resistance of the water between the electrodes is sufficiently great that practically all of the current follows its path of least resistance through the rheostat. As the coffee becomes stronger, however, a larger portion of the current passes between the electrodes and accordingly through the coil in the circuit breaker. When the solution has absorbed enough of the coffee to render its conductivity great enough to cause sufficient current to pass through this auxiliary circuit, the electro-magnet in the circuit breaker is sensitized, thereby causing the main circuit to be opened.

The invention also contemplates the provision of a circuit breaking device for use in the preparation of other fluids wherein the conductivity of the fluid either increases or decreases as the process of preparation progresses.

Other objects and advantages of the invention will be hereinafter specifically pointed out, or will become apparent, as the specification proceeds.

With the above indicated objects in view, the invention resides in certain novel constructions and combinations and arrangements of parts, clearly described in the following specification and fully illustrated in the accompanying drawing, which latter shows embodiments of the invention as at present preferred.

In said drawing:

Fig. 1 is a top plan view of an electrically heated coffee percolator and showing the various parts of the embodiment in broken lines.

Fig. 2 is a broken vertical section on line 2—2 of Fig. 1.

Fig. 3 is a broken vertical section on line 3—3 of Fig. 1.

Fig. 4 is a perspective view of the two electrodes and the means for mounting same.

Fig. 5 is a diagram of the preferred electrical circuit employed with the device.

Referring now to said drawing by reference numerals, the embodiment of the invention, as applied to coffee percolators, includes a pair of flat electrodes 9, constructed preferably of "stainless" steel, gold, or other plated metal to prevent electrolysis said electrodes being suitably spaced apart and mounted in a round insulating block 10, having tapered sides and an annular flange portion 11 at the upper end thereof, and carrying a pair of lugs 12 connected to said electrodes and extending downwardly below the lower surface of said block.

The block is mounted in an aperture in the base 14 of the coffee chamber 15 of an electrical heated coffee percolator 16, the tapered sides of the block providing a water-tight fit in the aperture, said percolator having an electrical heat unit 17, a central water tube 18, etc. The percolator is also provided with a base member 19 having a plurality of casters 20 and a vertical side portion 21, to the upper edge of which the liquid chamber 15 is secured.

A circuit breaker, which includes an electro-magnet 22 and a "U" shaped bracket 23, is mounted on an insulating base 24, the latter being secured to the base member 19 by means of screws 25. An armature 26 having a contact point 26' is pivotally mounted to the insulating base at 27. A stationary contact supporting member 28, carrying a contact point 29, adjacent to the contact point 26', is likewise secured to the insulating base.

In order to manually re-set the armature after the circuit has been opened, a plunger 30 having a head portion 31, is slidably carried within a bearing member 32, said plunger being secured to the upper portion of the armature at 33. The contact point 26 on the armature is held into firm engagement with the stationary contact point 29 by means of a downwardly extending flat spring 35 secured to the lower surface of the base portion 14 at 36. The spring is sufficiently strong to provide firm engagement between the contact points but is nevertheless light enough to allow movement of the armature when the magnet is sufficiently sensitized.

A conventional adjustable resistance coil or rheostat 37 is secured to the side portion 21 of the base member at 38, said rheostat being provided with a thumb-screw 39 for adjustment.

A block 40 having a pair of lugs 41 for the current supply cord (not shown) is secured to the rear portion of the percolator.

The preferred electrical circuit employed in this instance is illustrated in Fig. 5. One side of the circuit from the current supply A first passes through a fuse B, and then through the heat unit C. Upon leaving the latter the most of the current normally passes through the rheostat D and through the contact points E of the circuit breaker F, a small portion of the current passing through the auxiliary parallel circuit having the electrodes G in series. At the beginning of the preparation of the beverage the amount of current passing between the electrodes is exceedingly small because of the great resistance water has to the passage of electricity. As the water in the chamber gradually turns to coffee the resistance between the electrodes decreases, thereby allowing the passage of a greater amount of current therebetween, depending, of course, in any given instance, upon the amount of resistance at D. When a person desires a weak beverage the resistance at D is increased in order that a sufficient amount of the current may pass between the electrodes at an earlier stage in the preparation, and vice versa. Once the circuit has been broken by the coffee having become strong enough to allow sufficient current to pass through the auxiliary circuit to actuate the circuit breaker, the circuit may again be restored for the preparation of more beverage by the simple expedient of pulling out the plunger 30, thereby establishing the contact between the contact points 26' and 29.

It is desirable to keep the current in the auxiliary circuit, which passes between the electrodes, at a minimum for two reasons. First, because any great resistance at D would interfere with the heating unit, and second, because there is a slight tendency for gases to form at the electrodes with a higher current, thereby creating some electrolysis which is undesirable.

Considerable particularities of description, as to materials, part details, capacities and utilities may have been herein indulged in, but it will be understood that these statements, made with particular reference to that one, and the one now preferred, of the many possible embodiments of the invention which is illustrated in the drawing, are not in any way to be taken as definitive or limitative of the invention. Inasmuch as many apparently widely different embodiments of the invention could be made without departing from the scope thereof, it is intended that all matter contained in the above description or shown in the accompanying drawing shall be interpreted as illustrative and not in any limiting sense.

It is also to be understood that the language in the following claims is intended to cover all the generic and specific features of the invention herein described, and all statements of the scope of the invention which, as a matter of language, might be said to fall therebetween.

In other words, the scope of protection contemplated is to be taken solely from the appended claims, interpreted as broadly as is consistent with the prior art.

What I claim is:

1. A device for preparing liquid beverages and the like, by the application of heat to liquid including an electrically operated device and a source of current therefor, a main circuit including said source and said device, a pair of unequal parallel circuits and an electro-magnetically operated circuit breaking device in series with said main circuit, a pair of electrodes immersed within the liquid, said electrodes being in series with the greater of said parallel circuits, whereby when the resistance in said greater circuit decreases, the current passes therethrough, thereby actuating said circuit breaker.

2. A device for preparing beverages, the electrical conductivity of which increases as the beverage increases in strength including an electrically operated device and a source of current therefor, a main circuit including said source and said device, a resistance element in series with said main circuit, a pair of spaced electrodes immersed within the beverages and shunted around and in parallel with said resistance element, an electro-magnetically operated circuit breaker in series with said main circuit, the electro-magnet therein being in series with the shunt circuit, whereby when the resistance between said electrodes becomes less, sufficient current passes through said electro-magnet to actuate said circuit breaker.

3. In combination with a beverage preparing device, an electrically operated heat unit, a source of current, a main circuit including said source of current and said heat unit, and means for opening said circuit when the beverage has reached a certain predetermined strength, said means including a circuit breaker, a pair of spaced electrodes positioned within the beverage chamber, an auxiliary circuit including said electrodes and said circuit breakers, whereby, when the resistance between the electrodes decreases to a predetermined point, due to the increase in conductivity of the beverage, the circuit breaker will be actuated.

4. In combination with a beverage preparing device, an electrically operated heat unit, a source of current, a main circuit including said source of current when the beverage has reached a certain predetermined strength, said means including a variable resistance element in series with said main circuit, a circuit breaking element, an auxiliary circuit shunted around said resistance unit, and a pair of electrodes immersed within the liquid chamber, of the device, said electrodes being in series with said auxiliary circuit, whereby when the beverage has reached a predetermined strength, the current will pass through the auxiliary circuit and actuate the circuit opening element.

5. In combination with a beverage preparing device, an electrically operated heat unit, a source of current, a main circuit including said source of current and said heat unit, and means for opening said circuit when the beverage has reached a certain predetermined strength, said means including a pair of parallel circuits of unequal resistance in series with the main circuit, a pair of spaced electrodes in the lesser circuit, said electrodes being immersed within the liquid chamber in said device and a circuit opening device in said lesser circuit adapted to operate when the resistance in the lesser circuit decreases.

6. In a device for preparing beverages, an electrically operated heat unit and a source of current therefor, a main circuit including said source and said heat unit, a variable resistance unit in series with said main circuit, a pair of spaced electrodes shunted around and in parallel with said resistance unit, said electrodes being positioned within the beverage chamber in said device, an electro-magnetically operated circuit breaker in series with said main circuit, the electro-magnet therein being in series with the shunt circuit, whereby when the current passes through said shunt circuit the circuit breaker is actuated, opening said main circuit.

7. A device for preparing beverages including an electrically operated heat unit and a source of current therefor, a main circuit including said source and said device, a resistance unit in series with said main circuit, a pair of spaced electrodes positioned within the liquid chamber of the device and shunted around and in parallel with said resistance unit, an electro-magnetically operated circuit breaker in series with said main circuit, the electro-magnet therein being in series with the shunt circuit, whereby when the electrical conductivity of the beverages increase, due to its increase in strength the current passes through said shunt circuit, thereby actuating the circuit breaker, opening said main circuit.

8. A device for preparing liquid beverages including an electrically operated device and a source of current therefor, a main circuit including said source and said device, a variable resistance unit in series with said main circuit, a pair of spaced electrodes shunted around and in parallel with said resistance unit, said electrodes being positioned within the beverage chamber in said device an electro-magnetically operated circuit breaker in series with said main circuit, the electro-magnet therein being in series with the shunt circuit, whereby, when the resistance between said electrodes decreases the current passes through said shunt circuit, thereby actuating circuit breaker and opening said main circuit.

EDWIN A. SAUTER.